(12) United States Patent
Marino (10) Patent No.: US 6,517,307 B1
(45) Date of Patent: Feb. 11, 2003

(54) ATTACHMENT SYSTEM FOR LIFT TRUCKS

(76) Inventor: Sal Marino, 4452 Essex Cove, Springdale, AR (US) 72764

( * ) Notice: Subject to any disclaimer, the term of this patent is extended or adjusted under 35 U.S.C. 154(b) by 0 days.

(21) Appl. No.: 09/911,895

(22) Filed: Jul. 24, 2001

(51) Int. Cl.[7] .................................................. B66F 9/18
(52) U.S. Cl. ...................... 414/607; 414/785; 414/280; 414/661; 414/664; 187/222; 187/237; 410/42; 293/76; 293/150; 403/2
(58) Field of Search ................................. 414/607, 608, 414/659, 661, 664, 280; 187/222, 237; 293/150; 289/3; 403/2

(56) References Cited

U.S. PATENT DOCUMENTS

| | | | | |
|---|---|---|---|---|
| 1,247,569 A | * | 11/1917 | Palmer | 293/150 |
| 3,023,919 A | * | 3/1962 | Hobson | 414/607 |
| 3,200,978 A | * | 8/1965 | Brady et al. | 414/607 |
| 3,907,352 A | * | 9/1975 | Spain et al. | 293/76 |
| 4,266,818 A | * | 5/1981 | Hightower | 293/150 |
| 4,467,893 A | * | 8/1984 | Hobson | 414/607 X |
| 5,230,600 A | * | 7/1993 | Marino | 414/607 |
| 5,567,096 A | * | 10/1996 | Howard | 410/42 |
| 5,577,854 A | * | 11/1996 | Jacob et al. | 403/2 |
| 5,676,421 A | * | 10/1997 | Brodsky | 403/2 X |

* cited by examiner

Primary Examiner—Frank E. Werner
(74) Attorney, Agent, or Firm—Horst M. Kasper (57) ABSTRACT

A lift truck attachment for handling loads comprises a main frame assembly for attachment to an elevator of a lift truck and a lower slide assembly. The lower slide assembly includes an elongated sliding element for performing a reciprocal motion relative to the main frame assembly. A bottom slide cross tube is furnished and has an elongated structure extending substantially perpendicular to the elongated sliding element. An elongated pusher plate is attached to the bottom slide cross tube and extends substantially parallel to the elongated sliding element. A first shear plate has a first hole and is attached to an end of the bottom side cross tube. A second shear plate has a second hole and is rotatably attached to the first shear plate with a rotation axis disposed substantially parallel to the elongated sliding element. The first hole and the second hole have the same distance from the rotation axis. A threaded safety bolt penetrates through the first hole and through the second hole. A nut engages the threaded safety bolt for rigidly attaching the first shear plate to the second shear plate. The torsional strength of the threaded safety bolt is furnished such that the threaded safety bolt will yield when a safe torsional force level is exceeded.

10 Claims, 7 Drawing Sheets

ATTACHMENT SYSTEM FOR LIFT TRUCKS

BACKGROUND OF THE INVENTION

1. Field of the Invention

This invention relates to an attachment system for lift trucks.

2. Brief Description of the Background of the Invention Including Prior Art

Forklift attachments for top cap handling of major household appliances from a carton cap are widely used in industrial warehouses.

The front of the attachment exhibits flat pusher plates to come in contact with the cartons when lifting the appliance. The flat pusher plates provide a flat composite coplanar surface. The pusher plates have a flat surface and the surfaces of the pusher plates are aligned to be disposed in a plane. An extreme left hand pusher plate and an extreme right hand pusher plate are necessary to provide support for the loads to be carried. However, the left most plate and the right most plate often are subject to colliding with railroad car walls, truck trailer interiors and warehouse columns, etc. Because of the rigidity of the extremely disposed pusher plates such collisions damage not only the pusher plates involved, but also cause extended damage to the forklift attachment and such collisions engender major repairs and are a cause for substantial downtime of the whole forklift.

An attachment for fork lift trucks is taught by Marino in U.S. Pat. No. 5,230,600. A lift truck attachment for handling loads comprises a main frame assembly for attachment to an elevator of a lift truck and a lower slide assembly. A first channel member is associated with a first main frame vertical tube and disposed in an upright position. A second channel member is associated with a second main frame vertical tube and disposed substantially parallel to the first channel member. Upper closing members with center bores are attached to upper ends of the main frame vertical tubes and of lower sliding tubes. Lower sliding tubes are slidingly disposed in the main frame vertical tubes. First and second end members are attached at upper ends of first and second bolts. Third and fourth end members are attached at lower ends of first and second bolts. The first and second bolts pass through the center bores. The closing members are disposed between the first and third end members and between the second and fourth end members, respectively.

SUMMARY OF THE INVENTION

1. PURPOSES OF THE INVENTION

It is a general object of this invention to provide an improved attachment for fork lifts.

It is a further object of the present invention to provide an improved and sturdy attachment for a lift truck.

It is yet a further object of the present invention to provide an attachment structure for a lift truck, which is reliable and minimizes possibilities of serious damage during frequently rough operations of such lift truck.

It is yet another object of the present invention to provide an attachment for a lift truck which can be easily maintained and serviced at an economic cost.

It is another object of the present invention to provide an attachment for fork lift construction which is easier serviceable.

It is a further object of the present invention to present an attachment for fork lifts constructs such as to be less subject to serious damage.

It is yet a further object of the present invention to furnish outermost plates of an attachment system to fork lift trucks such as to prevent shearing forces exerted on the outermost plates to exceed a permissible limit of force exerted thereby on the attachment frame.

It is yet another an object of the invention to provide for plates to be fail-safe attached to the attachment element of a lift truck to avoid serious damage caused by collisions with other lift trucks.

It is another object of the present invention to provide a system of attaching and of fastening outermost pusher plates in a sufficiently rigid manner to survive when subjected to normal usage of the attachment, but to yield appropriately.

These and other objects and advantages of the present invention will become evident from the description which follows.

2. BRIEF DESCRIPTION OF THE INVENTION

According to the present invention there is provided for a lift truck attachment having breakaway wings for handling loads.

The present invention provides a system of attaching and of fastening outermost pusher plates in a sufficiently rigid manner to survive when subjected to normal usage of the attachment, but to break away when encountering unusual forces such as during a collision between an outermost pusher plate and some static object generating substantial resistance force opposed to a motion of an outermost pusher plate.

Such breakaway feature acts to prevent an original force or an external force from being transmitted to the main frame of the forklift attachment. Thus such breakaway feature prevents the possibility of damage to the forklift equipment and avoids costly repairs to the forklift attachment.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
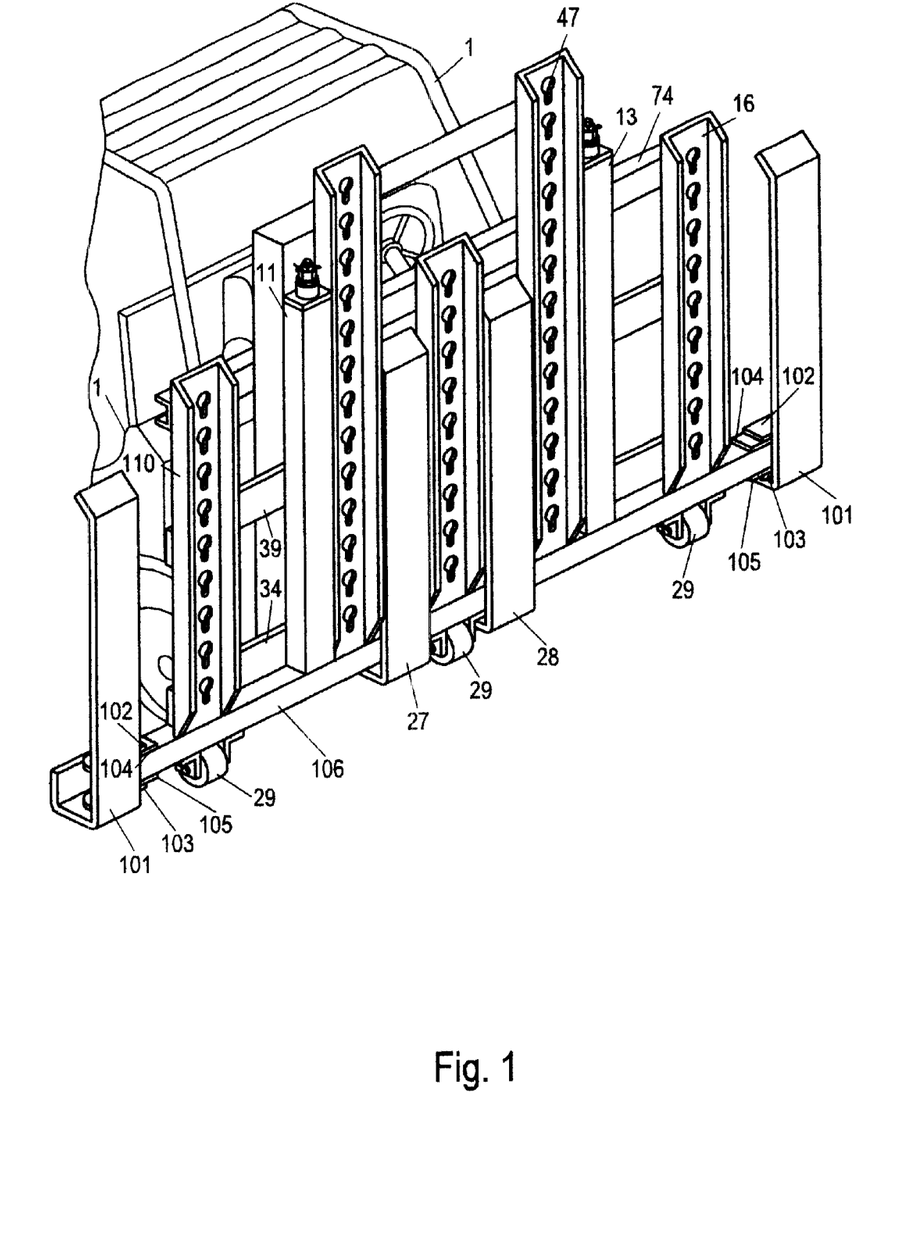
FIG. 1 is a perspective, partial elevational view of a lift truck with an invention attachment including breakaway wings with an attachment main frame in a lowered position relative to an attachment drop plate.

Marino in U.S. Pat. No. 5,230,600 shows in FIG. 1 a fork lift truck with an attachment for lifting. FIG. 1 of the present application shows an attachment according to the present invention for a lift truck 1. The lift truck 1 can be constructed similar to that taught in U.S. Pat. No. 5,230,600 to Marino.

The present invention includes two main assemblies, i.e. a main frame assembly or attachment main frame 110, and a lower slide assembly or attachment drop plate 111. The lower slide assembly 111 operates vertically and reciprocally with the main frame assembly 110.

As illustrated in FIG. 1, the main frame assembly 110 is comprised of two vertical tubes 11, 13. Five vertical channels 10 with keyholes 47 are fixed to said vertical tubes 11, 13. The assemblies, formed in each case by the vertical channels 10 and the vertical tubes 11, 13, are tied together by horizontal members 34, 39, 74.

Figure 2:
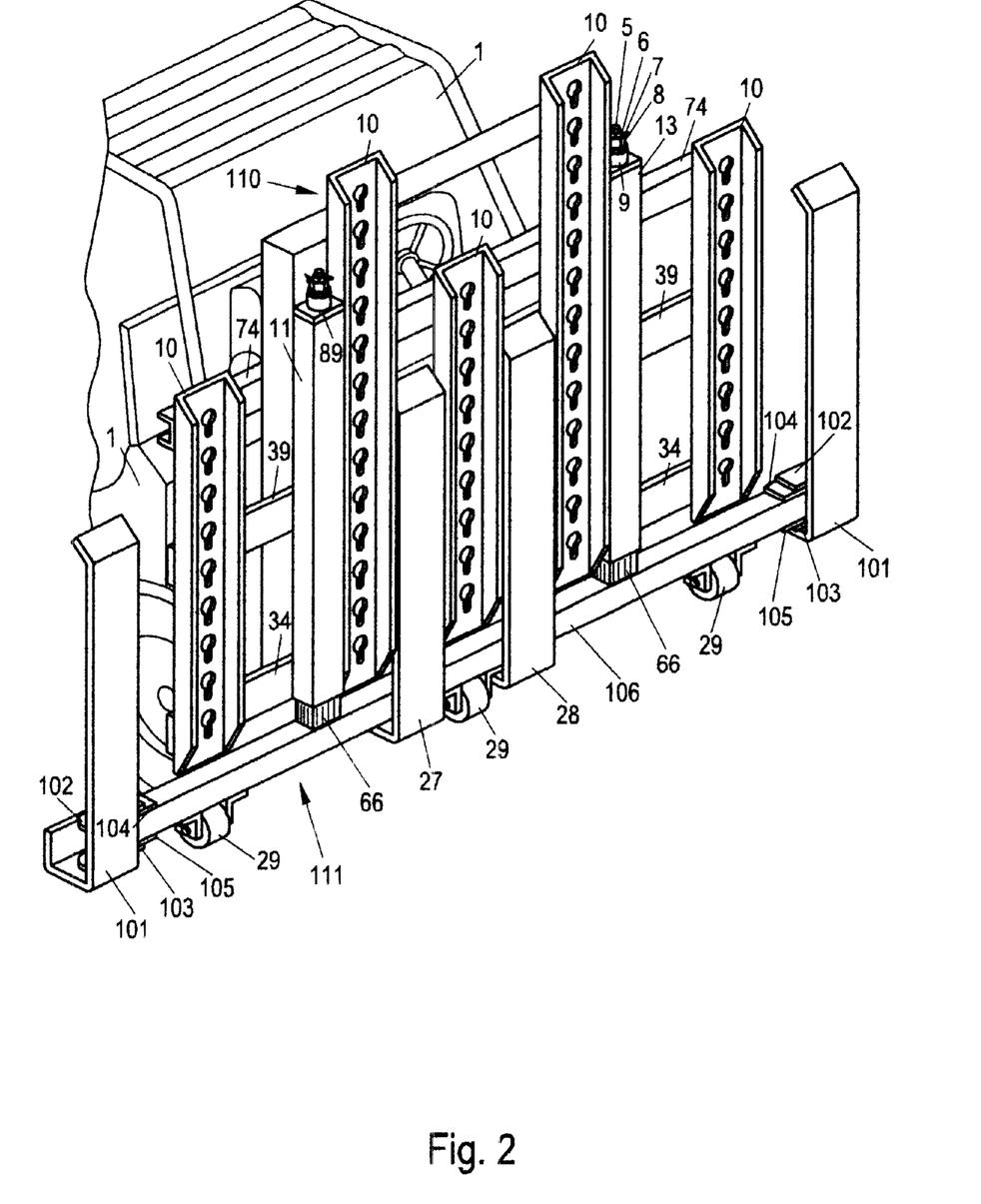
FIG. 2 is a perspective, partial elevational view of a lift truck with an invention attachment including breakaway wings and with an attachment main frame in a raised position relative to an attachment drop plate.

FIGS. 1 and 2 show a perspective view of a complete front face of the lower slide assembly 111 attached to the main frame 110 of the attachment to a fork lift. In this construction two pusher plates 27, 28 are employed forming a common plane with their front surfaces.

The pusher plates 27, 28 are all disposed in one plane. Breakaway wings 101 are formed by outer plates. The breakaway wings 101 are attached to the lower slide assembly 111. The wheel assemblies are attached to the attachment drop plate 111 and are comprised of a roller 29, a roller bracket, a roller shaft, and retaining lock rings.

Figure 3:
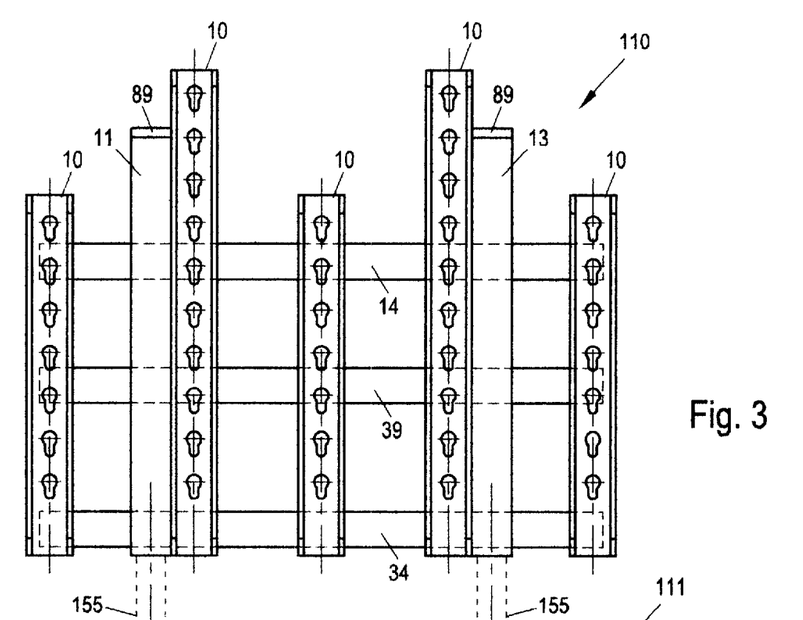
FIG. 3 is a schematic view of the main frame of the attachment for a fork lift truck.

The lower slide assembly 111 (FIG. 4) is reciprocal movably attached to the main frame assembly 110 (FIG. 3). A horizontal member or a cross bar 34, 39, and 74 is permanently attached to the main frame tubes 11 and 13 of the main frame 110.

The lower slide assembly 111 can drop by a defined amount relative to the main frame 110. FIG. 1 shows the attachment drop plate 111 in an uppermost position relative to the attachment main frame 110. FIG. 2 shows a position, where the attachment drop plate 111 is lowered relative to the position assumed by the attachment drop plate 111 in FIG. 1, where the sliding tubes 66 of the attachment drop plate 111 slide out of the vertical tubes 11 and 13.

A downward travel of the sliding tubes 66 within the main frame tubes 11, 13 is in each case limited by a long bolt as shown in FIG. 2. The bolt 5 is disposed in the main frame vertical tubes 11, 13 and the sliding tubes 66, respectively, and is held by a castle nut 7 and a cotter pin 6. A flat washer 8 is employed to abut the castle nut 7. A cushion layer 9 of a highly elastic material can be placed between the washer 8 and a top plate 89 at the head of the main frame tubes 11, 13, respectively.

The operation of the invention manifests itself when considering the material handling of major household appliances such as refrigerators, washers, and dryers, etc. An operator will move the lift truck into a position in front of the carton box with its side wall.

When the invention attachment is employed to lift cartons in the above-described manner, the invention attachment is constructed such that, when cartons are lifted, the lower slide assembly 111 drops below the bottom edge of the carton thereby assuring that a lateral reaction force is at all times applied by the lower slide assembly 111 to the bottom edge of the carton where the carton is the strongest. The lower slide assembly 111 will at all times be lowered below the bottom edge of the carton regardless of the height of the carton. It is advantageous to lower the lower slide assembly 111 somewhat below the bottom edge of the carton in order to achieve a uniform stacking of the cartons.

FIG. 3 shows a schematic view of the attachment main frame 110 of the attachment for a fork lift truck. In particular the vertical channels 10 and the main frame tubes 11 and 13 11 and the cross bars 34, 39 and 74 are attached to each other and can be recognized. A plate 89 is disposed at the head of the said vertical tubes 11, 13.

Figure 4:
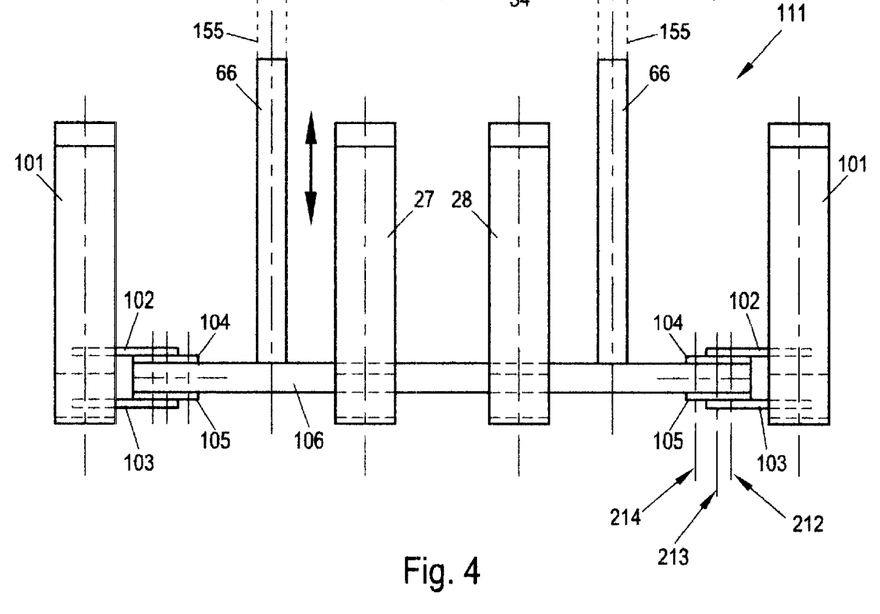
FIG. 4 is a front view of the lower slide assembly with a bottom slide cross tube and breakaway wings attached thereto.

FIG. 4 shows a front view of the attachment drop plate 111 with a bottom slide cross tube 106 and breakaway wings 101 attached thereto and matching to the main frame 110 shown in FIG. 2. Alignment dashed lines 155 disposed between FIGS. 3 and 4 show how the sliding tubes 66 are adapted to slide into the vertical tubes 11, 13.

The pusher plates 27, 28 and the breakaway wings 101 are all disposed having front surfaces located in one plane. The pusher plates 27, 28 and the breakaway wings 101 are attached to a bottom slide cross tube 106. A hingeable shear plate 103 connects the breakaway wing 101 to the bottom cross tube 106. The rotation axis 212 of a rotation and mounting bolt 112 passing through shear plates 102, 103, 104, 105 and through the bottom slide cross tube 106 and defines a rotation of the breakaway wing 101 around the rotation axis 212. The center line 213 of a non-ferrous shear bolt defines the position of a shear bolt, which connects the shear plate 102 and/or the shear plate 103 attached to the breakaway wing 101 to the shear plate 104 and/or to the shear plate 105 attached to the bottom slide cross tube 106. A centerline 214 defines the position of a shear plate mounting bolt 114 attaching the shear plate 104 and/or the shear plate 105 to the bottom slide cross tube 106.

Figure 5:
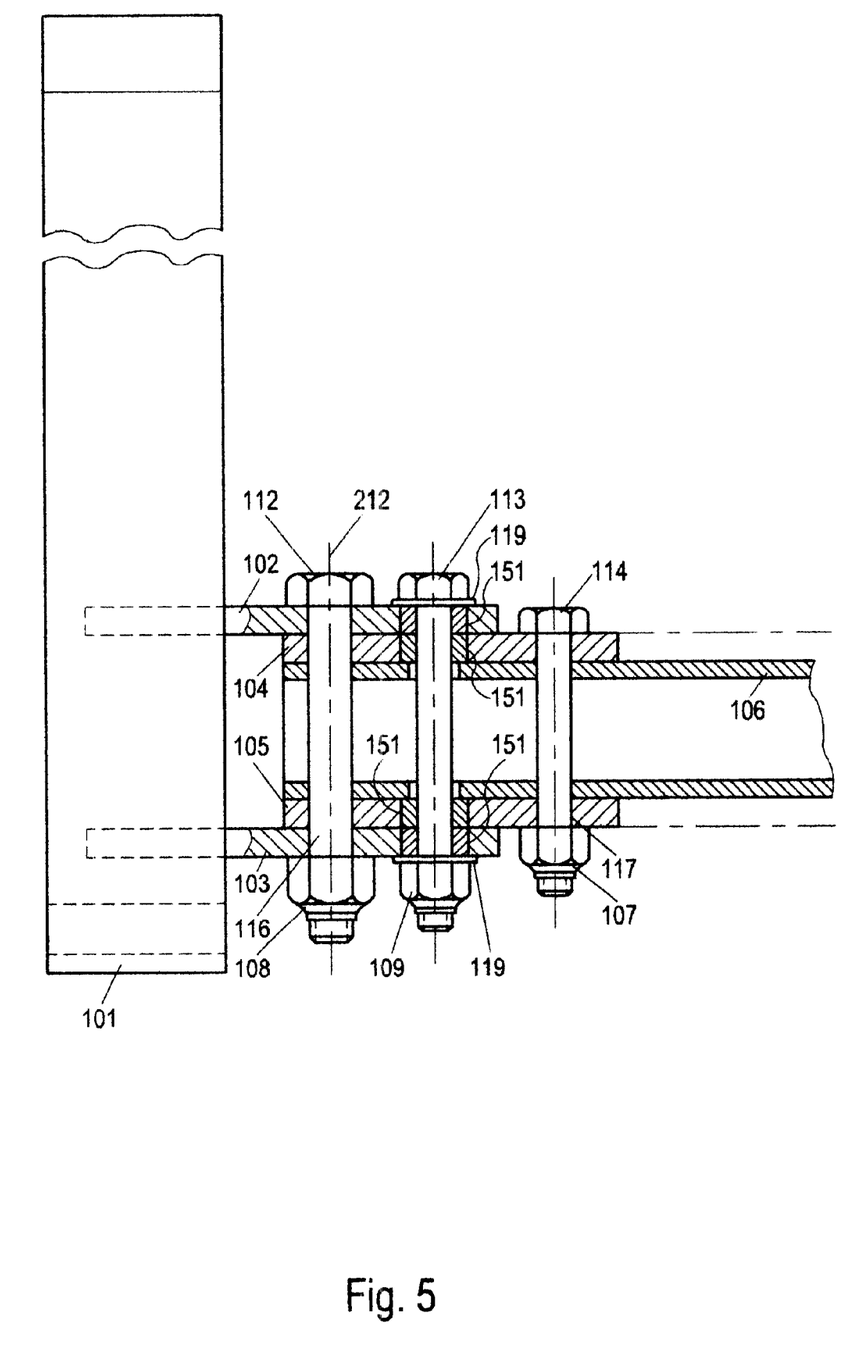
FIG. 5 is a side elevational and in part sectional view of the attachment of the breakaway wings with a single shear bolt.
Figure 6:
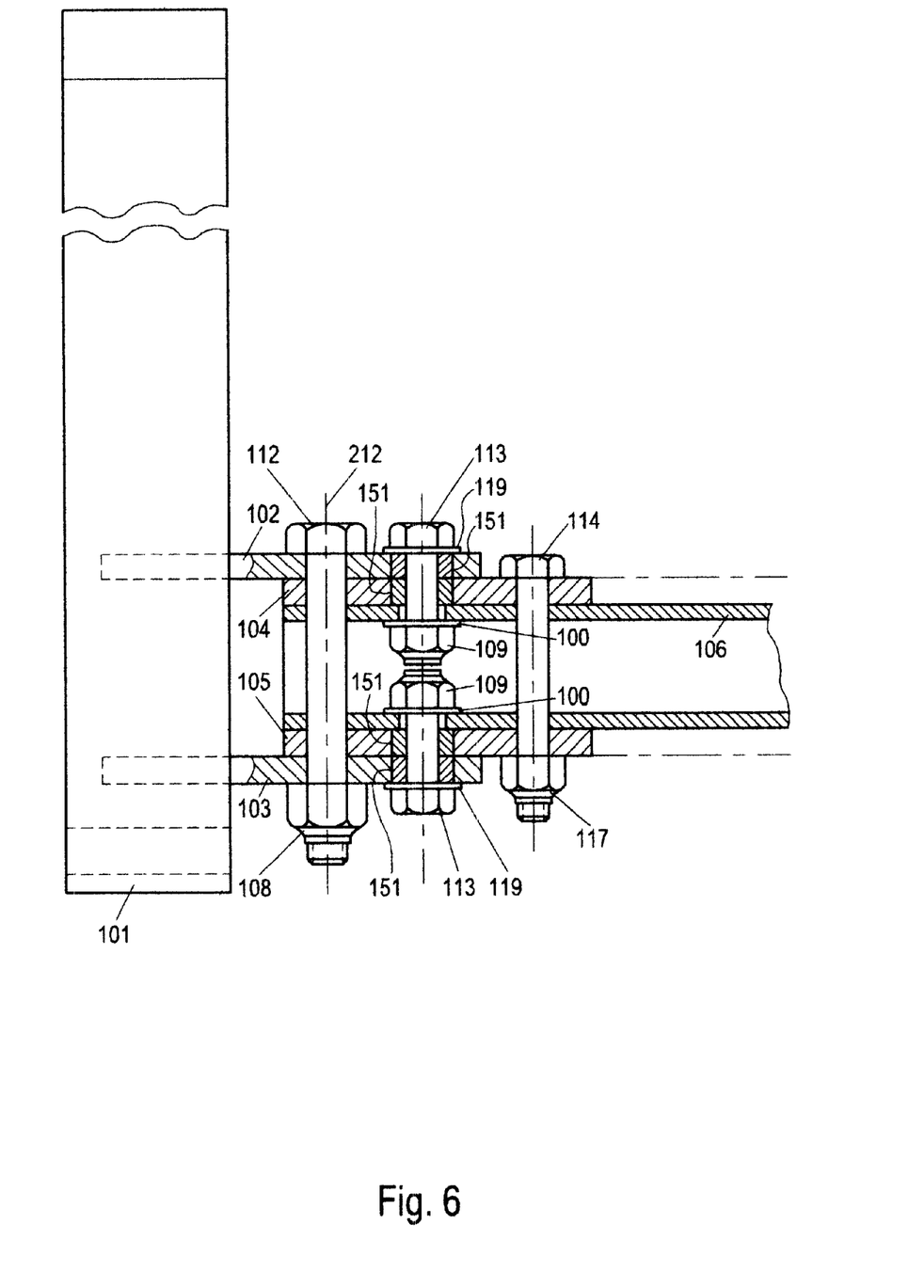
FIG. 6 is a side elevational and in part sectional view of the attachment of the breakaway wings with dual shear bolts.

The attachment of the breakaway wings with a single shear bolt is shown in FIG. 5 in a side elevational and in part sectional view. The long bolts 213 fastened by the nuts 109 in FIG. 5 result in a double shear against the hardened steel bushings of the hole 151, wherein the double shear is about equal to double the shear value of a single short bolt in case two short bolts are employed as shown in FIG. 6 and each experiences a single shear. Ring washers 119 are disposed between the shear plate 102 and the head of the bolt 213 and between shear plate 103 and the nut 109. As seen in FIG. 5, the breakaway wing 101 is capable of rotating around the mounting bolt 112 and around axis 212 once the shear bolt has yielded to excessive forces exerted on the breakaway wing 101.

The bottom slide cross tube 106 can carry the shear plates 104 and 105 like an end reinforcement such that the end of the bottom slide cross tube 106 coincides with the corresponding end of the shear plates 104 and 105. In this case the bottom slide cross tube 106 is furnished with appropriate holes to allow passing of the bolts 112, 113, 114. The thickness of the shear plates 104 and 105 can be from about 1 to 3 times the wall thickness of the bottom slide cross tube 106 and is preferably from about 1.5 to 2.5 times the thickness of the shear plate 104 or 105. The thickness of the shear plates 102 and 103 can be from about 0.8 to 1.3 times the thickness of the shear plate 104 or 105.

The attachment of the breakaway wings with dual shear bolts is shown in FIG. 6 in a side elevational and in part sectional view. The axis of rotation 212 is disposed at the bolt 112. Two shear bolts 113 aligned along an axis are employed. The total force of shear resistance of the arrangement in FIG. 5 with a long bolt 213 and the arrangement in FIG. 6 with two short bolts 113 are equal. Ring washers 119 are disposed between the shear plate 102 and the head of the bolt 113 and between the shear plate 103 and the head of the bolt 113. Ring washers 100 are disposed between bottom slide crosstube 106 and the nuts 109.

Figure 7:
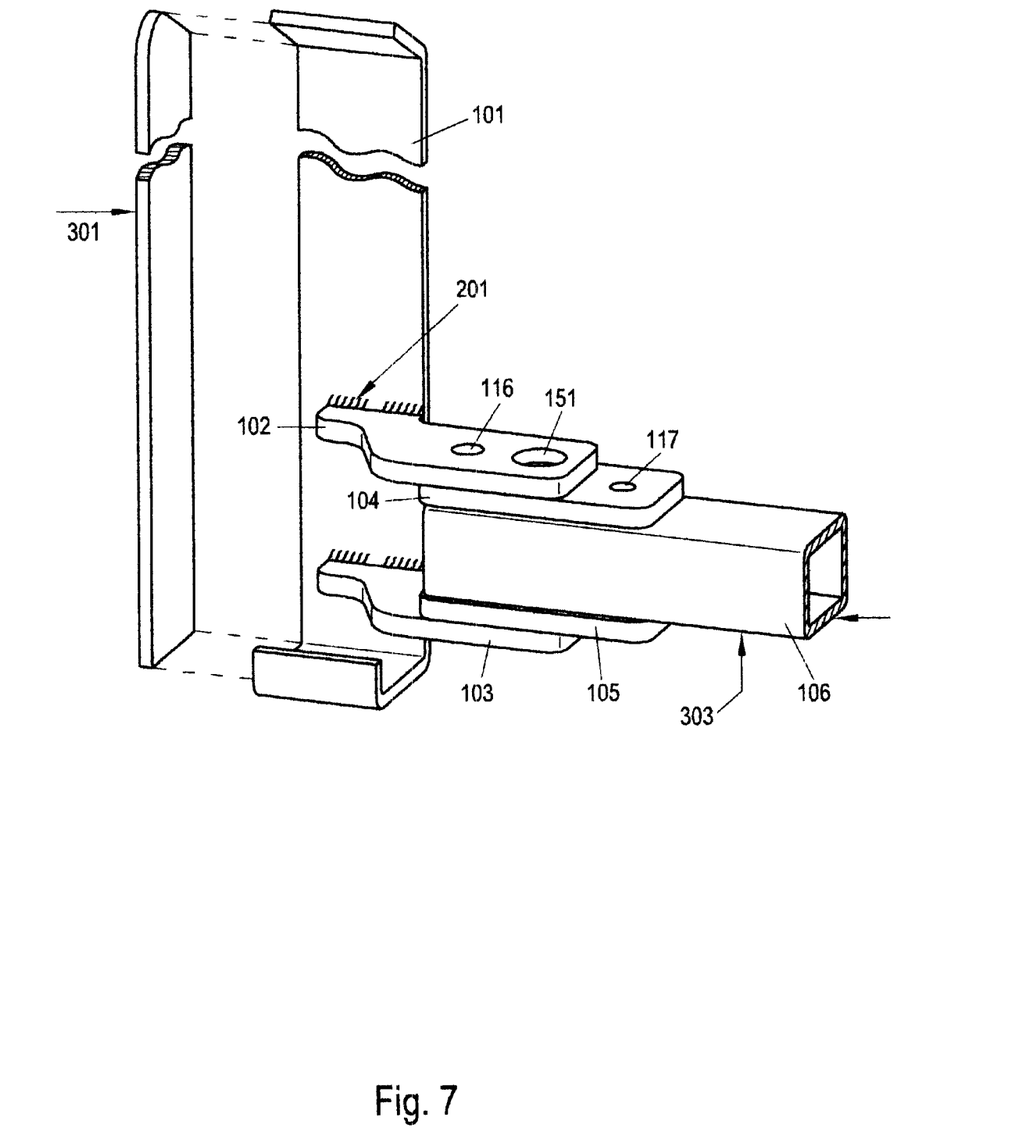
FIG. 7 is a rear perspective view of the support of the breakaway wing on the bottom slide cross tube.

FIG. 7 is a rear perspective view of the support of the breakaway wing 101 on the bottom slide cross tube 106. The shear plate 102 and/or 103 is attached to the breakaway wing 101 with welding seams 201 extending in particular near the longitudinal edges of the breakaway wing 101.

Figure 8:
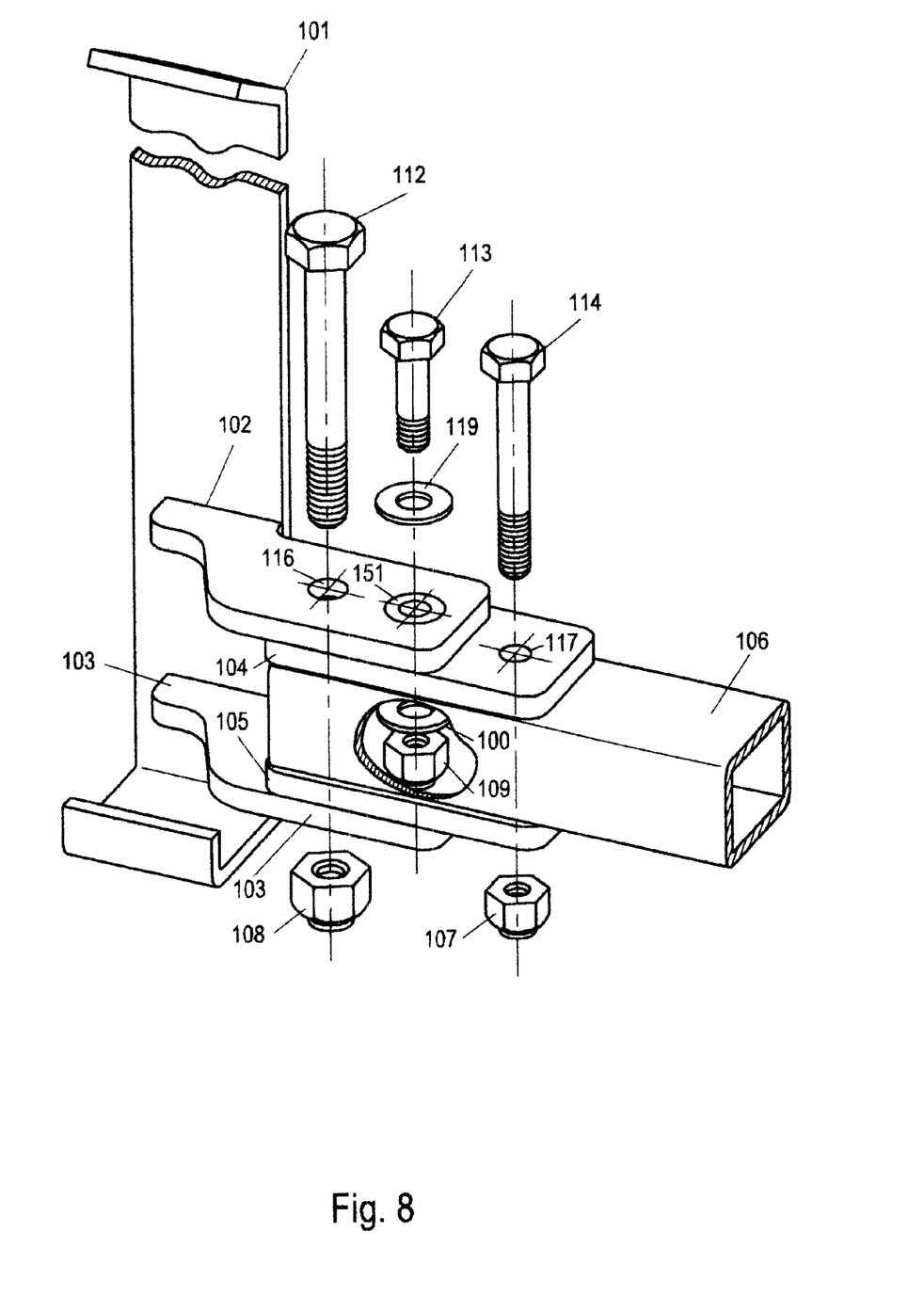
FIG. 8 is a rear side perspective detail view of the support of the breakaway wing on the bottom slide cross tube.

FIGS. 7 and 8 illustrate the extension plates or breakaway wings or side attachments 101.

An overhanging or a protrusion of the breakaway wings 101 could result in damage during collisions with standing and fixed objects and destroy the attachment to the fork lift truck in case the breakaway wings 101 would not yield. This could also damage the lower slide assembly if the breakaway wings were completely rigidly mounted. The invention structure of the breakaway wings 101 having a yield point in their attachment stability permits the breakaway wings 101 to perform their normal function of staying coplanar with pusher plates 27, and 28, illustrated in FIG. 1.

The height level 303 of the bottom of slide cross tube 106 can be from about 1" to 4" above the bottom level of the breakaway wing 101 and is preferably about 2" above the bottom level of the breakaway wing 101. A $1/32$" shim layer is preferably disposed between the between the shear plate 104 and the bottom side cross tube 106 and between the shear plate 105 and the bottom side cross tube 106 to compensate for paint thicknesses. The shear plate 102 and the shear plate 103 are attached by 1½ welds as shown in FIG. 7 on both sides of "lamb chop" to the breakaway wing 101 resulting in eight welding seams for each breakaway wing as shown in FIG. 7 resulting in a total of 16 welds for two breakaway wings 101. For creating an ease of welding the weld 201 of "lamb-chops", it would be best to weld the side plate 301 of size about $1/4 \times 3$" to the break-away wing 101 during production.

It is furthermore advantageous that the lower hinge assembly as well as the upper hinges of the invention structure are such that when the breakaway wing 101 is struck, it will only rotate around rotation axis 212 about the bolt 112 (FIG. 6).

The accompanying FIG. 8 shows a 4" wide metal wing 101 supporting an upper shear plate 102 and a lower shear plate 103 attached to the metal breakaway wing 101. Two opposing shear plates 104 and 105 are disposed between the upper shear plate 102 and the lower shear plate 103. The two opposing shear plates 104 and 105 are attached to the bottom cross tube 106. All the shear plates, 102, 103, 104 and 105 have hardened steel bushings fitted to each of the plates 102, 103, 104 and 105 at the location of a hole 151.

The bolt 112 and the bolt 114 when installed in holes 116 and 117, respectively, cooperate with the nuts 108 and 107 to maintain alignment between all of the shear plates. The bolt 114 attaches the shear plate 104 to the bottom side cross tube 106. The bolt 112 attaches the shear plate 102 rotatably to the shear plate 104 and to the bottom slide cross tube 106. The bolts 112, 113, 114 preferably have their heads disposed at the upper side of the shear plate 102 or, respectively, of the shear plate 104. The bolts 112, 113, 114 are preferably disposed along a straight line extending in parallel to the bottom slide cross tube 106. The wing 101 with attached shear plates 102 and 103 can rotate about bolt 112 provided no bolt 113 is installed into the bushing of hole 151. Once the bolt 113 is installed through washer 119, the hardened steel bushings of hole 115 and cooperating with washer 100 and fastened with nut 109, then the wing 101 and shear plates 102 and 103 can no longer rotate freely around bolt 112. When exceedingly strong external forces are applied to the bolt 113, the bolt will crack and break and release the shear plate 102 to rotate around the bolt 112.

In principle, it is possible to provide instead of or in addition to the connection between the shear plates 102 and 104 also a bolt connection between the shear plates 103 and 105. However, such bolt connection between the shear plates 103 and 105 may be somewhat less service friendly as the embodiment shown in FIG. 5.

In addition, it is possible to use long bolts 112, 113, 114, wherein these long bolts 112, 113, 114 not only pass through holes in the shear plates 102 and 104, but in addition also through holes provided in the shear plates 103 and 105. Such construction renders the nuts more accessible after a breaking away of a breakaway wing 101.

Inserting a measured strength bolt 113 through both the shearing plate 102 and the shearing plate 104 prevents the rotation of shearing plates 102 and 103 around the bolt 112 and relative to shearing plates 104 and 105 during normal operation. Selecting the correct ratio of the cross-sectional areas of bolts 112, 113 and 114 and further selecting proper distances between the centerline positions of bolts 112, 113 and 114, and further selecting appropriate materials for making the bolts 112, 113 and 114 furnishes a situation wherein the bolt 113 will shear off against the hardened steel bushings of the hole 151 when wing 101 is struck under sufficient force. The hardened steel bushings of the hole 151 are used so as to prevent the softer shear plates 102, 103, 104 and 105 from galling. The bolt 113 is dimensioned such that the bolt 113 will not shear during normal operation of the forklift.

The size and quality of the shear bolt 113 will be such as to yield only upon application of a suitable torsion yield force. Such torsion yield force may correspond to a force of from about 20 kilopond to 1000 kilopond applied to the breakaway wing 101 and preferably to a force of from about 100 kilopond to 500 kilopond applied to the breakaway wing 101.

Different kind of operations of the forklift require various strengths for normal use. Moreover, the breakaway wings 101 will be able to hinge either forward or backward by a complete 90 degrees each way depending on which way the respective breakaway wing 101 was hit. The forces resisting shear to be provided by shear bolt 113 can be varied and are achieved by using for example different metallic materials for bolt 113. Various metals suitable to be used for safety bolt 113 are aluminum, brass and mild steel in that order for furnishing ascending shear strength. The shear strength can be also adapted by the construction and dimensions of the long bolt 213 or of the short bolts 113. In general employing two bolts can allow to achieve a comparatively total higher shear strength as compared with a single bolt 213 and resisting shear force strength can be achieved by using two bolts 113, thereby, better controlling the resistive shear force.

The bolt 113 is preferably positioned between the bolts 112 and 114.

Employing mixed variations of the upper bolt 113 and an additional corresponding lower bolt adds more variation to the resistive shear force. Again, in ascending order of resistive force the following embodiments are of interest e.g. aluminum on top and aluminum on bottom, aluminum on top and brass on bottom, brass on top and on bottom, brass on top and mild steel on bottom, mild steel on top and mild steel on bottom.

It will be understood that each of the elements described above, or two or more together, may also find a useful application in other types of fork lift attachment assemblies differing from the types described above.

While the invention has been illustrated and described in the context of a support for a breakaway wing of a fork lift attachment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

List of References

1—lift truck
5—long bolt
6—cotter pin
7—cotter pin
8—castle nut
9—cushion layer
10—vertical channel
11—vertical tube
13—vertical tube
27—pusher plate
28—pusher plate
29—roller
34—horizontal member
39—horizontal member cross bar
47—keyholes
66—sliding tube
74—horizontal member
89—top plate
100—inner washer
101—breaking wing
102—shear plate
103—shear plate
106—bottom slide cross tube
107—nut
108—nut
109—nut
110—attachment main frame
111—lower slide assembly attachment drop plate
112—member bolt
113—bolt
114—shear plate mounting bolt
106—hole
117—hole
119—washer
151—hole
155—alignment lines
201—welding seams
212—rotation axis
213—center line of mainframe shear bolt
214—center line of mounting bolt
301—side plate
303—height level

What is claimed as new and desired to be protected by Letters Patent is set forth in the appended claims:

1. A lift truck attachment for handling loads comprising an attachment main frame assembly for attachment to an elevator of a lift truck; and
   an attachment drop plate including an elongated sliding element for allowing a reciprocal motion by the main frame assembly;
   a bottom slide cross tube having an elongated structure extending substantially perpendicular to the elongated sliding element;
   an elongated pusher plate attached to the bottom slide cross tube and extending substantially parallel to the elongated sliding element;
   a first shear plate having a first hole and attached to an end of the bottom slide cross tube;
   a second shear plate having a second hole and rotatably attached to the first shear plate with a rotation axis disposed substantially parallel to the direction of reciprocal motion, wherein the first hole and the second hole have the same distance from the rotation axis;
   a threaded safety bolt penetrating through the first hole and through the second hole;
   a nut engaging the threaded safety bolt for rigidly attaching the first shear plate to the second shear plate, wherein the shearing strength of the threaded safety bolt is furnished such that the threaded safety bolt will yield when a safe torsional force level is exceeded.

2. The lift truck attachment for handling loads according to claim 1 further comprising
   a third shear plate having a third hole and attached to the end of the bottom slide cross tube at an opposing height level relative to a position where the first shear plate is attached;
   a fourth shear plate having a fourth hole and rotatably attached to the third shear plate with a rotation axis disposed substantially parallel to the direction of reciprocal motion, wherein the third hole and the fourth hole have the same distance from the rotation axis;
   a second threaded safety bolt penetrating through the third hole and through the fourth hole.

3. The lift truck attachment for handling loads according to claim 2 further comprising
   a first washer disposed between a head of the first safety bolt and the second shear plate;
   a second washer disposed between a nut of the first safety bolt and the first shear plate;
   a third washer disposed between a head of the second safety bolt and the fourth shear plate;
   a fourth washer disposed between a nut of the second safety bolt and the third shear plate.

4. The lift truck attachment for handling loads according to claim 1 further comprising
   a third shear plate having a third hole and attached to the end of the bottom slide cross tube at an opposing height level relative to a position where the first shear plate is attached;
   a fourth shear plate having a fourth hole and rotatably attached to the third shear plate with a rotation axis disposed substantially parallel to the direction of reciprocal motion, wherein the third hole and the fourth hole have the same distance from the rotation axis as do the first hole and the second hole, and wherein the threaded safety bolt also penetrates through the third hole and through the fourth hole.

5. The lift truck attachment for handling loads according to claim 4 further comprising a first washer disposed between a head of the first safety bolt and the second shear plate;

a second washer disposed between a nut of the first safety bolt and the third shear plate.

6. The lift truck attachment for handling loads according to claim 1 further comprising a breakaway wing solidly attached to the second shear plate.

7. The lift truck attachment for handling loads according to claim 6 further comprising welding seams disposed between the pusher plate and the second shear plate for solidly attaching the breakaway wing to the second shear plate and wherein the planar extension of the breakaway wing is disposed perpendicular tot he planar extension of the second shear plate.

8. The lift truck attachment for handling loads according to claim 1 wherein the pusher plate extends in a vertical direction, wherein the second shear plate extends in a horizontal direction;

wherein a breakaway wing is formed by the pusher plate with a lower horizontal extension disposed below the second shear plate;

wherein the breakaway wing is formed with an upper end in part horizontal extension disposed above the second shear plate; and further comprising a side plate attached to the breakaway wing spanning a plan perpendicular both to the plane of the breakaway wing and to the plane of the second shear plate.

9. The lift truck attachment for handling loads according to claim 1 wherein the second shear plate is disposed on a side of the first shear plate disposed opposite to the side of the first shear plate where the bottom slide cross tube is attached.

10. The lift truck attachment for handling loads according to claim 1 wherein the bottom slide cross tube is of rectangular cross-section.

* * * * *